US 6,307,861 B1

(12) United States Patent
Hogg et al.

(10) Patent No.: US 6,307,861 B1
(45) Date of Patent: Oct. 23, 2001

(54) METHOD AND SYSTEM FOR MULTICAST USING A SATELLITE NETWORK

(75) Inventors: Gerald James Hogg, Fountain Hills; Mark Hajime Kaya, Scottsdale, both of AZ (US); Lawrence Mitchell Firestone, San Diego, CA (US); Shawn Wesley Hogberg, Chandler, AZ (US); Thomas Peter Emmons, Jr., Mesa, AZ (US); Israel Arieh Cimet, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/271,701

(22) Filed: Mar. 18, 1999

(51) Int. Cl.$^7$ .................................................. H04J 3/26
(52) U.S. Cl. ..................................... 370/432; 342/357.08
(58) Field of Search .................................... 370/432, 310, 370/312, 315, 316, 323, 324, 325, 328, 331, 367, 390, 396, 420, 492, 501; 455/427, 431, 436, 439, 442, 11.1, 13.1, 13.2; 342/354, 356, 257.06, 357.08, 357.12, 357.14, 357.15

(56) References Cited

U.S. PATENT DOCUMENTS

| 5,541,927 | | 7/1996 | Kristol et al. ..................... 370/94.2 |
|---|---|---|---|
| 5,588,005 | * | 12/1996 | Ali et al. ............................. 370/346 |
| 5,613,194 | | 3/1997 | Olds et al. ........................ 455/12.1 |
| 5,724,345 | * | 3/1998 | Guarneri et al. ................. 370/316 |
| 5,793,973 | * | 8/1998 | Birdwell et al. .................. 455/223 |
| 5,920,697 | * | 7/1999 | Masters et al. ................... 709/219 |
| 5,929,809 | * | 7/1999 | Erlick et al. ...................... 342/372 |
| 5,969,675 | * | 10/1999 | Erlick ............................... 342/373 |
| 5,977,907 | * | 11/1999 | Gross ............................... 342/354 |
| 5,999,797 | * | 12/1999 | Zancho et al. ................... 455/12.1 |
| 6,018,659 | * | 1/2000 | Ayyagari et al. ................ 455/431 |
| 6,023,605 | * | 2/2000 | Sasaki et al. .................... 455/12.1 |
| 6,078,810 | * | 6/2000 | Olds et al. ........................ 455/428 |
| 6,122,499 | * | 9/2000 | Magnusson ..................... 455/405 |
| 6,157,624 | * | 12/2000 | Zancho ............................ 370/316 |

FOREIGN PATENT DOCUMENTS 9916277    1/1999 (WO) ........................... H04Q/7/38

* cited by examiner

Primary Examiner—Douglas Olms
Assistant Examiner—Phirin Sam
(74) Attorney, Agent, or Firm—Frank J. Bogacz; Jeff D. Limon

(57) ABSTRACT

A multicast message is transmitted from an originating subscriber unit (110, FIG. 1) through a network of satellite communications nodes (120, 130, and 140) to a plurality of receiving subscriber units (150, 160, and 170). Each message is distributed through the network of satellite communications nodes (120, 130, and 140) and replicated at the node nearest to the receiving subscriber unit. Receiving subscriber units (150, 160, and 170) are mapped into geographic cells which allows a single multicast transmission to be transmitted from the satellite communications node to those subscriber units within the same geographic cell. Multicast groups and membership rules are established by the originating subscriber unit (110) through a service provider (180). A multicast session manager (185) manages the multicast session.

17 Claims, 3 Drawing Sheets

METHOD AND SYSTEM FOR MULTICAST USING A SATELLITE NETWORK

FIELD OF THE INVENTION

The invention relates to satellite communications and, more particularly, to techniques for implementing point-to-multipoint and multipoint-to-multipoint multicast communications in a satellite system.

BACKGROUND OF THE INVENTION

In a unicast only communications system, messages intended for a plurality of receiving subscribers are typically transmitted to each receiving subscriber by way of duplicating each message at or near the originating subscriber's terminal. Thus, in a typical unicast system, transmitting a multicast message is substantially identical to transmitting the same message multiple times from an originating subscriber to each individual recipient in a point-to-point fashion. These redundant transmissions consume bandwidth and other system resources as each message is separately routed through the communications network. Some terrestrial communication systems attempt to reduce the overall resources required to transmit multicast messages through the use of routers and other processing assets which incorporate increased complexity as additional logic is used to control and optimize the message traffic routed through the communications network.

In a satellite communications system, where subscribers communicate through a network of satellite communications nodes, ground-to-satellite (uplink) and satellite-to-ground (down link) resources are often limited. Thus, redundant transmissions of messages from originating subscriber units are highly undesirable. Additionally, it is often weight, power, and cost prohibitive to introduce complex routing logic on board satellite communications nodes. Further, in a satellite communications system which involves satellites in motion relative to terrestrial based subscribers, each satellite must frequently update its own routing table as subscribers are handed off from one satellite communications node to another. Therefore, since each satellite must manage a dynamically changing list of users, this adds significant complexity to each satellite communications node. For the above reasons, terrestrial multicast routing schemes are unlikely to benefit satellite communications systems where each satellite moves relative to the terrestrial based users due to the desire to reduce complexity on board each satellite communications node.

Therefore, it is highly desirable to employ a method and system for conducting multicast sessions customized for use with a satellite communications network. It is also highly desirable to devise a method for managing multicast in a way that decreases the amount of uplink and down link bandwidth required to conduct multicast sessions.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DESCRIPTION OF THE PREFERRED EMBODIMENTS

A method and system for multicast using a global satellite network provides the capability for groups of subscriber units to conduct multicast sessions without redundant message transmission through the satellite network. These multicast sessions can be single speaker multicasts, moderated group discussions, or other multicast topologies. Additionally, the method and system ensure that multicast sessions are conducted using minimal satellite uplink and down link resources, while taking advantage of more plentiful satellite system resources such as inter-satellite cross links. Further, multicast sessions can be performed without adding significant complexity to each of the satellite communications nodes. These factors allow a flexible multicast service to be provided at a low cost to subscribers.

Figure 1:
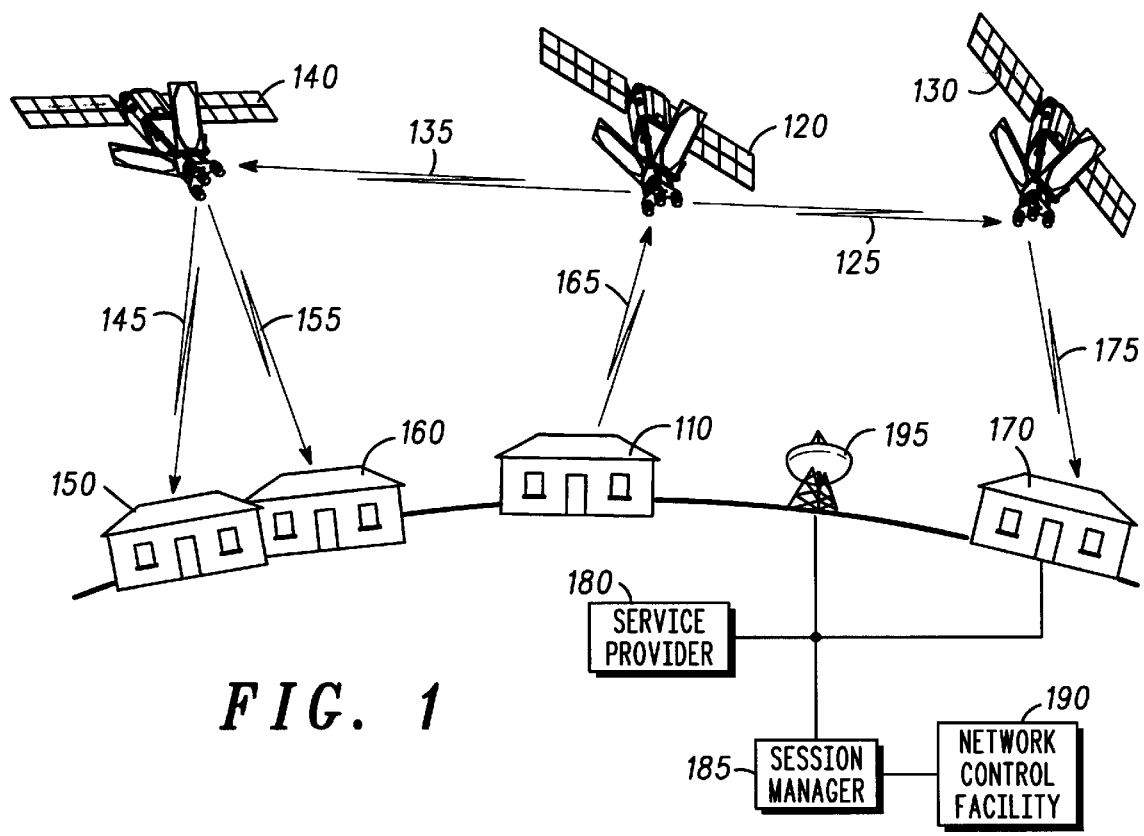
FIG. 1 is a block diagram of a satellite communications network architecture which provides a multicast capability to a plurality of subscriber units in accordance with a preferred embodiment of the invention.

FIG. 1 is a block diagram of a satellite communications network architecture which provides a multicast capability to a plurality of subscriber units in accordance with a preferred embodiment of the invention. In FIG. 1, subscriber unit 110 transmits a multicast message to subscriber units 150, 160, and 170 through the communications network represented by communications nodes 120, 130, and 140. In a preferred embodiment, communications nodes 120, 130, and 140 are satellite communications nodes which communicate with each other through at least one inter-satellite cross-link and are representative of a global communications network comprising a constellation of low earth orbit satellites. In this embodiment, the multicast session is configured and executed through service provider 180, which creates the multicast group, manages the group, and spawns the multicast session. In a preferred embodiment, service provider 180 communicates with subscriber units 110, 150, 160, and 170 by way of ground station 195 through the satellite communications network represented by satellite communications nodes 120, 130, and 140.

In a preferred embodiment, subscriber unit 110 can be described as an originating subscriber unit, since preferably all multicast message traffic originates from this subscriber unit. Accordingly, satellite communications node 120 can be described as a receiving communications node, since this node preferably receives all multicast traffic from originating subscriber unit 110. Additionally, satellite communications nodes 130 and 140 can be described as distributing satellite communications nodes since these nodes provide the resources by which messages from originating subscriber unit 110 are distributed and conveyed to subscriber units 150, 160, and 170.

Other resources, which are desirably employed in order to facilitate the multicast session, include session manager 185 and network control facility 190. In a preferred embodiment, session manager 185 manages each multicast session, and allocates bandwidth required to conduct the session. Other tasks performed by session manager 185 include the tabulation of groups by session by subscriber unit core addresses, group creation and population, member notification, session triggering and dissolution in accordance with session rules, and controlling admission. Network control facility 190, allocates multicast addresses, as well as manages capacity across the entire global communications network. In a preferred embodiment, session manager 185 and network control facility 190 communicate with subscriber units 110, 150, 160, and 170 by way of ground station 195 through the satellite communications network represented by satellite communications nodes 120, 130, and 140

In a preferred embodiment, subscriber units 110, 150, 160, and 170, communicate with each satellite through links 165, 145, 155, and 175, respectively. In the presently envisioned global satellite communications network, each of these links represents a relatively scarce resource, as each of these links may only provide limited up link and down link bandwidth due to power, bandwidth, antenna aperture size, and other limitations of satellite communications nodes 120, 130, and 140. Each message received by satellite communications node 120 from subscriber unit 110 is conveyed through cross-links, such as cross-links 135 or 125, to each satellite which comprises the global satellite communications system. By conveying each message to each satellite which comprises the satellite communications network, each message is available for use by each satellite.

Also in the presently envisioned system, cross-links 125 and 135 possess substantially larger bandwidth than any of links 145, 155, 165, and 175. Therefore, each satellite communications node can make as many (or as few) copies as are required to service those subscriber units in contact with the particular satellite. For the example of FIG. 1, satellite communications node 140 produces two copies of each message from originating subscriber unit 110 and conveys the message to subscriber units 150 and 160. When multiple subscriber units are in sufficiently close proximity to be illuminated by the down link beam at one time, a single copy is sent to these multiple subscriber units. Although the example of FIG. 1 suggests that satellite communications node 140 produces only two copies of each message from originating subscriber unit 110, this is not intended to be limiting in anyway. Each satellite within the communications system, may produce hundreds of copies of each message from originating subscriber unit 110 in accordance with a routing information which specifies the addresses of the multicast session members.

Figure 2:
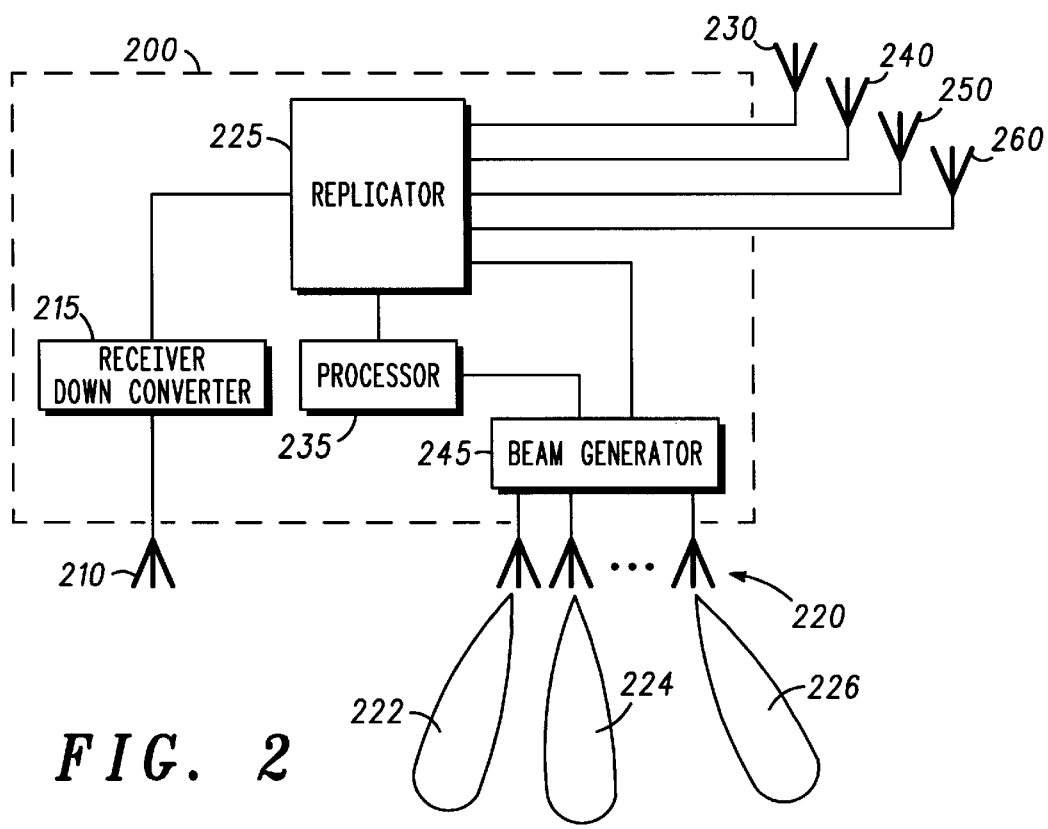
FIG. 2 is a block diagram of a satellite communications node which enables a multicast message replication in accordance with a preferred embodiment of the invention.

FIG. 2 is a block diagram of a satellite communications node which enables a multicast message replication in accordance with a preferred embodiment of the invention. In FIG. 2, multicast messages transmitted from an originating subscriber unit, or other external source, are received through uplink antenna 210. Receiver/down converter 215 conveys this message to replicator 225. In accordance with a preferred embodiment, replicator 225 conveys each message to another, similar satellite through at least one of cross-link antennas 230, 240, 250, and 260. This process is preferably repeated by other satellites in the communications satellite network until each satellite receives each message.

Processor 235, which is coupled to replicator 225 determines the number of copies required to be transmitted through down link antennas 220, which generate antenna beams 222, 224, and 226 in order to convey the message to the receiving subscriber units. In a preferred embodiment, processor 235 determines a number of geographic cells in which each subscriber unit is located. Processor 235 additionally determines the number of antenna beams, such as antenna beams 222, 224, and 226, which should be generated in order to serve each geographic cell. Thus, in the event that two or more subscriber units are located within the same geographic cell, only one antenna beam should be required in order to transmit each message to the subscriber units located within that cell. By way of mapping each subscriber unit into a group of geographic cells, the number of replications performed by replicator 225 can be minimized. Additionally, the number of beams which need to be generated by beam generator 245, as well as other onboard resources required by satellite communications node 200 to transmit multicast messages to each subscriber unit, are minimized.

Processor 235 preferably maintains a routing table which lists the geographic cell addresses of each receiving subscriber unit. As satellite communications node 200 moves in its orbit, additional subscriber units may be added to the routing table as these subscriber units are handed off to satellite communications node 200 from other, similar satellites of the global satellite communications network. Accordingly, subscribers may be deleted from the routing table as satellite communications node 200 hands subscribers to other, similar satellites. As an example, satellite communications node 200 may experience a large increase in routing table entries as the node passes over a large metropolitan area. These routing table entries may be present for several minutes as the satellite passes over the area. As satellite communications node 200 leaves the metropolitan area, each of these entries may be handed off to another, similar satellite. Thus, the routing table used by processor 235 within satellite communications node 200 may be a dynamic table where receiving subscriber units are added and deleted as the multicast session progresses.

Figure 3:
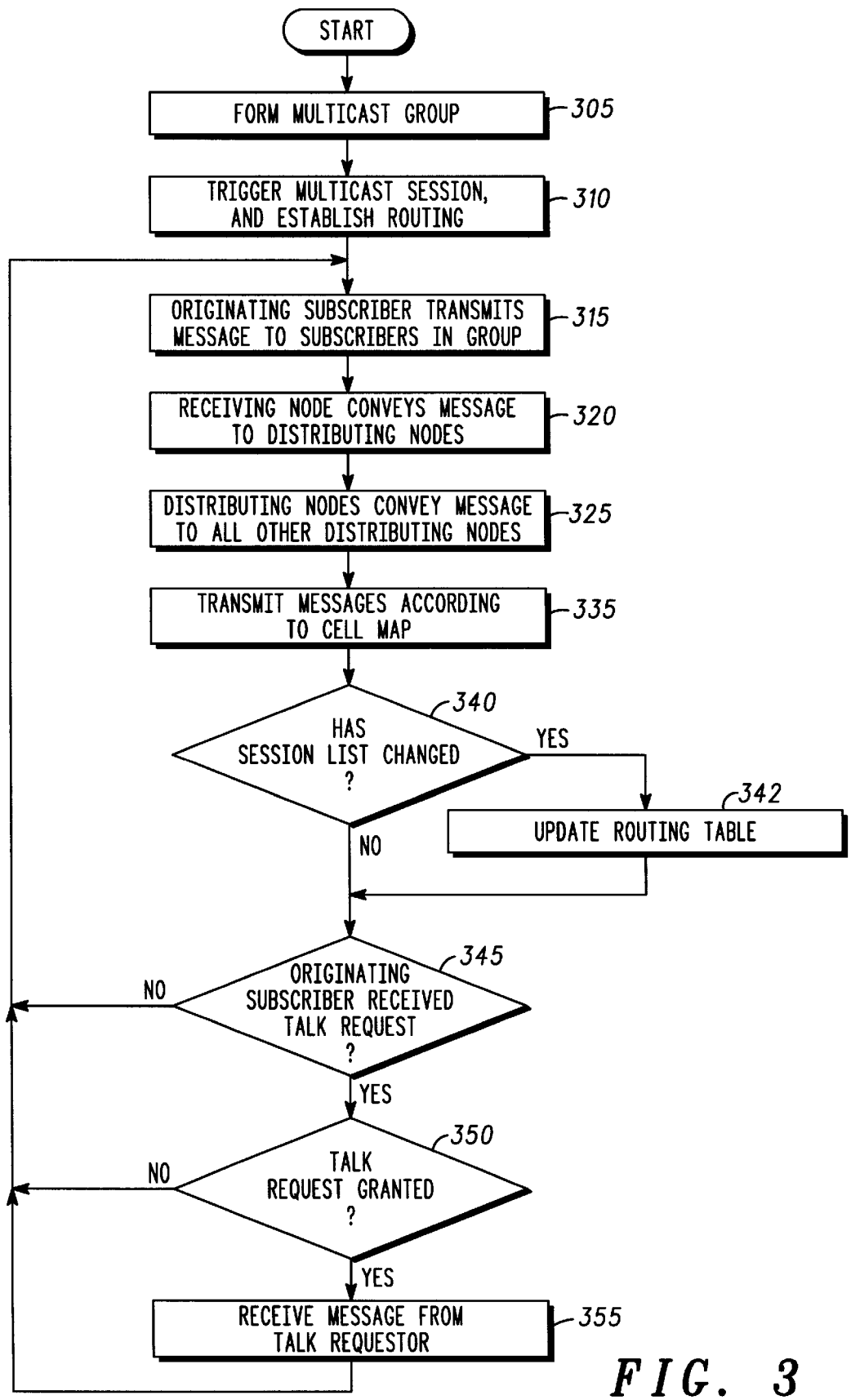
FIG. 3 is a flow chart of a method executed by a satellite communications system in order to conduct a multicast session in accordance with a preferred embodiment of the invention.

FIG. 3 is a flow chart of a method executed by a communications system in order to conduct a multicast session in accordance with a preferred embodiment of the invention. The satellite communications network architecture of FIG. 1 is suitable for performing the method. When started, the method begins in step 305, where a multicast group is formed. In this step, an originating subscriber unit creates a multicast group through the assistance of a service provider. Along with a list of the multicast session members, the originating subscriber may also specify a set of rules which control entry and access to the multicast group. These rules, for example, may be equipment characteristics, such as the desirability that multicast group members possess a specific type of higher bandwidth subscriber equipment for use with a multicast video conference. Other examples of these rules may be limitations imposed on the age, professional affiliation, or other characteristic of an individual subscriber. The rules may also designate a universal set where any member who wishes to join a multicast group can join the session. The rules may indicate multicast session initialization rules, and what types of sessions are permissible.

In step 310, a multicast session is triggered. In a preferred embodiment, a session manager, such as session manager 185 of FIG. 1, triggers the multicast session. In the presently envisioned system, each member of the multicast group formed in step 305 is preferably transmitted an alert which indicates that the multicast session will commence shortly. In step 310, each session member issues a request to its serving satellite to be added to the multicast routing table. The session manager configures message filters on a trusted portion of the subscriber unit to ensure that only authorized session members are permitted to issue join or leave requests.

In step 315, after the multicast session is triggered and routing to each group member is established in step 310, the originating subscriber unit transmits a message to the subscribers of the multicast group. This message can be one or more data packets containing video, text, digitized audio, or any other type of multicast information. In step 320, a receiving satellite communications node receives the message from the originating subscriber unit and, in step 325, conveys this message to the distributing satellite communications nodes. This step is preferably performed repeatedly until each satellite communications node in the network receives the message transmitted by the originating subscriber unit of step 315.

In step 335 each distributing communications node determines the number of message replications which are required in order to transmit the message to each receiving subscriber unit. Step 335 desirably involves each satellite determining the number of geographic cells in which each subscriber unit is located and mapping each receiving subscriber unit into the geographic cells. In step 335, the message is transmitted to each receiving subscriber unit.

In step 340, each satellite determines if it's current routing table is in need of updating. Changes to the routing table within each satellite can come about as a new subscriber seeks to join the multicast session or as a subscriber has chosen to leave the multicast group. Changes to the routing table can also come about as a result of a hand off wherein a subscriber is added to or removed from the routing table due to the relative motion of the satellite communications node.

If the decision of step 340 indicates that the routing table should be updated, step 342 is executed where the satellite routing table is updated. In an alternate embodiment, step 342 is executed concurrent with other steps of FIG. 3. If the decision of step 340 indicates that the group list has not changed, or after the update of step 342 has been performed, the method executes step 345 where the originating subscriber unit checks to determine if a "talk request" has been received. The talk request feature enables the method of FIG. 3 to accommodate moderated group discussion sessions, where the originating subscriber unit performs the moderator function. This provides receiving subscriber units with the opportunity to originate messages so that these can be received by the remaining receiving subscriber units. By executing step 345, the originating subscriber can moderate the multicast session and allow members of the multicast session group to originate messages through their own terminals.

If the decision of step 345 indicates that no talk request has been received, the method continues at step 315, where the originating subscriber unit generates the next multicast message. If the decision of step 345 indicates that a talk request has been received, the method executes step 350, where the originating subscriber unit determines whether the talk request will be granted. If the originating subscriber unit does not grant the talk request, the method continues at step 315. If, however, the talk request is granted, then the originating subscriber unit executes step 355 where a message is received from the originating subscriber unit. This message is then transmitted to the remaining members of the multicast session group by executing the method beginning with step 315.

Figure 4:
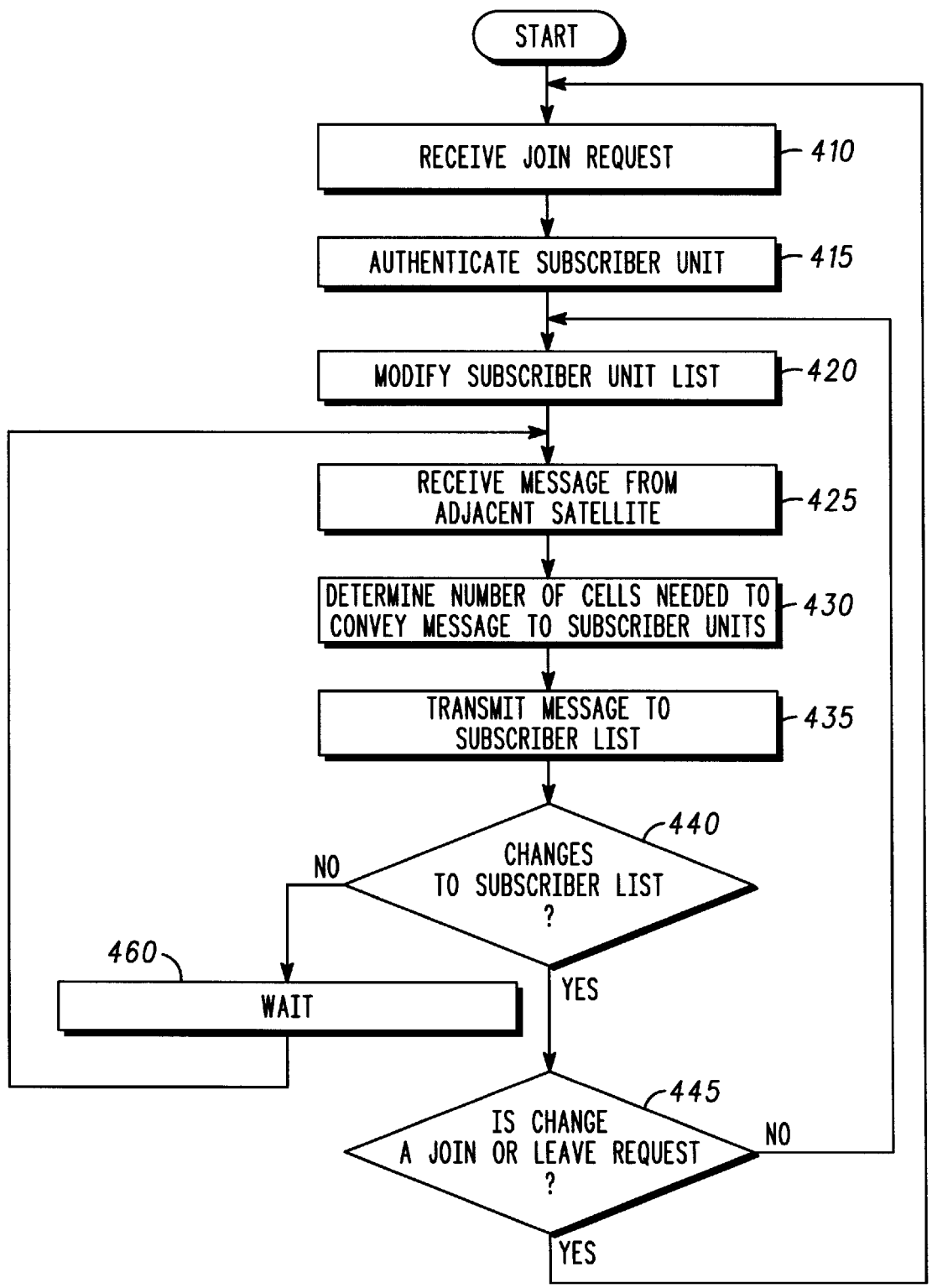
FIG. 4 is a flow chart of a method performed by the satellite communications node of FIG. 2 which provides a multicast capability within a satellite communications network in accordance with a preferred embodiment of the invention.

FIG. 4 is a flow chart of a method performed by the satellite communications node of FIG. 2 which provides a multicast capability within a satellite communications network in accordance with a preferred embodiment of the invention. In step 410, the satellite communications node receives a join request from the session manager. The join request indicates that a particular subscriber unit not previously part of the original multicast group wishes to join the group. In step 415 the join request is authenticated to determine if the particular subscriber meets the criteria specified in any rules generated by the originating subscriber unit.

In step 420, the routing table within the satellite communications node is modified in order to add the new receiving subscriber unit. In step 425, a multicast message is received from an adjacent satellite. In step 430, a number of cells required to convey the message to each subscriber unit is determined. The routing table of step 430 preferably includes the subscriber unit added in step 420. In step 435, the particular multicast message is then transmitted to each of the subscriber units. In step 440, the satellite determines if changes to the subscriber list are required. These changes may include the reception of a join request from a subscriber unit, a leave request, or a subscriber hand off.

If the decision of step 440 indicates that no changes to the subscriber list are required, the satellite waits (as in step 460) until a new message is received from an adjacent satellite before executing step 425. If the decision of step 440 indicates that changes to the subscriber list are required, the satellite executes step 445, where it is determined if the change is necessitated by the reception of a join request. If the change is brought about by a join request being received, step 410 is executed where the satellite receives the join request from the subscriber unit and authenticates it in step 415. If the decision of step 445 indicates that the change is not necessitated by a join request, the satellite communications node assumes that the change to the subscriber list has been brought on by a leave request or a handoff request. In either of these cases, the method returns to step 420 and the subscriber list is modified accordingly.

A method and system for multicast using a global satellite network provides the capability for groups of subscriber units to conduct multicast sessions by way of transmitting each message through the satellite network and replicating each at the node closest to the receiving subscriber unit. Additionally, the method and system ensure that multicast sessions are conducted using minimal satellite uplink and down link resources, while taking advantage of more plentiful satellite system resources such as inter-satellite cross links. Further, multicast sessions can be performed without adding significant complexity to each of the satellite communications nodes. This allows multicast sessions with single speaker multicasts, or other topologies to be conducted at minimal cost to the multicast session member.

Accordingly, it is intended by the appended claims to cover all modifications of the invention that fall within the true spirit and scope of the invention.

What is claimed is:

1. A method for multicasting messages using a network of communications nodes, said network of communications nodes being divided into a receiving communications node and a plurality of distributing communications nodes, said method comprising the steps of:

an originating subscriber unit transmitting a message to the network of communications nodes;

said receiving communications node conveying said message to each of said plurality of distributing communications nodes;

said plurality of distributing communications nodes mapping a plurality of subscriber units into a number of geographic cells;

said plurality of distributing communications nodes multicasting said message to said plurality of subscriber units by way of said geographic cells;

said mapping step additionally comprises the step of handing off one of said plurality of subscriber units from one of said plurality of distributing communications nodes to a second one of said plurality of distributing communications nodes; and said mapping step further comprises the step of replicating said message a number of times proportionate to said number of geographic cells.

2. The method of claim 1 wherein said network of communications nodes are satellites orbiting in a low earth orbit.

3. The method of claim 1 wherein said mapping step additionally comprises the step of at least one of said plurality of distributing communications nodes obtaining routing information from a multicast routing table.

4. The method of claim 1 wherein said transmitting step further comprises the step of a session manager configuring a message filter on a trusted portion of said originating subscriber unit.

5. The method of claim 1 wherein said transmitting step additionally comprises the step of said originating subscriber unit receiving a talk request from one of said plurality of subscriber units.

6. The method of claim 5 wherein said transmitting step further comprises the step of said originating subscriber unit granting said talk request.

7. The method of claim 6 wherein said transmitting step further comprises the step of said originating subscriber unit receiving said message from one of said plurality of subscriber units in response to said granting of said talk request.

8. In a communications node, a method for transmitting a message to a plurality of subscriber units, said method comprising the steps of:

receiving a message from an external source;

determining a number of cells used to convey said message to said plurality of subscriber units;

replicating said message a number of times proportionate to said number of cells; and transmitting said message to said plurality of subscriber units using said number of cells.

9. The method of claim 8 wherein said determining step further comprises the step of using a routing table to determine addresses of said plurality of subscriber units.

10. The method of claim 8 wherein said determining step further comprises the step of handing off one of said plurality of subscriber units from said communications node to another communications node.

11. The method of claim 8 further comprising the step of receiving a join request from one of said plurality of subscriber units.

12. The method of claim 8 further comprising the step of receiving a leave request from one of said plurality of subscriber units.

13. The method of claim 8 further comprising the step of receiving a handoff request from one of said plurality of subscriber units.

14. A system for conducting a multicast session, comprising:

an originating subscriber unit which transmits a multicast session message;

a constellation of satellite communications nodes which receives said multicast session message and distributes said multicast session message to the satellites of said constellation;

a plurality of receiving subscriber units wherein certain ones of said plurality of receiving subscriber units receive said multicast session message transmitted from certain ones of said constellation of satellite communications nodes;

a session manager coupled to said constellation of satellite communications nodes which determines the certain ones of said plurality of receiving subscriber units which receive said multicast session message from said certain ones of said constellation of satellite communications nodes; and a network control facility coupled to said constellation of satellite communications nodes for allocating addresses for certain ones of said plurality of receiving subscriber units.

15. The system of claim 14 wherein said constellation of satellite communications nodes distributes said multicast session message through at least one satellite cross link.

16. The system of claim 14 wherein said constellation of satellite communications nodes additionally determines a number of cells required to transmit said multicast session message to said certain ones of said plurality of receiving subscriber units.

17. The system of claim 14 wherein said session manager additionally allocates bandwidth to said constellation of satellite communications nodes to allow said multicast session message to be conveyed by way of said constellation of satellite communications nodes.

* * * * *